(12) United States Patent
Krishna (10) Patent No.: US 10,592,566 B2
(45) Date of Patent: Mar. 17, 2020

(54) INTELLIGENT EDGE DEVICE FOR FILTERING INTERNET OF THINGS (IOT) DATA

(71) Applicant: CA, INC., New York, NY (US)

(72) Inventor: Vikas Krishna, San Jose, CA (US)

(73) Assignee: CA, Inc., New York, NY (US)

( * ) Notice: Subject to any disclaimer, the term of this patent is extended or adjusted under 35 U.S.C. 154(b) by 280 days.

(21) Appl. No.: 14/926,902

(22) Filed: Oct. 29, 2015

(65) Prior Publication Data

US 2017/0126836 A1   May 4, 2017

(51) Int. Cl.
*H04L 29/08* (2006.01)
*G06F 16/9535* (2019.01)

(52) U.S. Cl.
CPC ......... *G06F 16/9535* (2019.01); *H04L 67/12* (2013.01)

(58) Field of Classification Search
CPC .... H04L 67/32; H04L 67/02; G06F 17/30867
See application file for complete search history.

(56) References Cited

U.S. PATENT DOCUMENTS

| | | | | |
|---|---|---|---|---|
| 5,357,564 A * | 10/1994 | Gupta | ..................... | H04M 3/36 379/112.01 |
| 8,060,592 B1 * | 11/2011 | Watsen | ................. | H04L 41/085 709/223 |
| 8,438,630 B1 * | 5/2013 | Clifford | .................. | G06F 21/60 375/240.02 |
| 9,231,767 B2 * | 1/2016 | Yu | ......................... | G06Q 10/107 |
| 2008/0307489 A1 * | 12/2008 | Hubbard | ................. | H04L 51/12 726/1 |
| 2012/0179787 A1 * | 7/2012 | Walsh | ................. | H04L 63/0281 709/219 |
| 2015/0244803 A1 * | 8/2015 | Kim | ...................... | G06F 3/0611 709/213 |
| 2016/0014146 A1 * | 1/2016 | Nakata | ................ | H04L 12/6418 726/12 |
| 2016/0203711 A1 * | 7/2016 | Scherping | ............. | H04W 4/046 370/310 |
| 2017/0078195 A1 * | 3/2017 | Raman | .................... | H04L 45/74 |

* cited by examiner

*Primary Examiner* — Chris Parry
*Assistant Examiner* — Abderrahmen Chouat
(74) *Attorney, Agent, or Firm* — Meyertons, Hood, Kivlin, Kowert & Goetzel, P.C.

(57) ABSTRACT

A method includes performing operations as follows on a processor of an edge device of a first network: providing a data filter rule in the edge device, the first network being under the authority of a first entity, receiving data from a thing in the first network, communicating the data toward an information processor via a second network when the data satisfies a condition of the data filter rule permitting communication of the data outside of the first network, the second network being under the authority of a second entity, and communicating the data toward a storage processor on the first network when the data does not satisfy the condition of the data filter rule permitting communication of the data outside of the first network. The first and second entities are different entities.

21 Claims, 5 Drawing Sheets

| Transmission Report ||
|---|---|
| Thing A ||
| Blocked | Sent |
| 10 MB | 3 MB |

*FIG. 5A*

| Transmission Report ||
|---|---|
| Thing A ||
| Blocked | Sent |
| 20 bursts | 5 bursts |

*FIG. 5B*

INTELLIGENT EDGE DEVICE FOR FILTERING INTERNET OF THINGS (IOT) DATA

BACKGROUND

The present disclosure relates to the Internet of Things (IoT), and, in particular, to methods, systems, and computer program products for filtering information generated by things in the IoT.

The Internet of Things (IoT) refers to a network of physical and virtual things having embedded computer systems associated therewith that allow the things to exchange data with other entities, such as a user, operator, manufacturer, technician, analyst, etc. based on the International Telecommunication Union's Global Standards Initiative. The IoT may allow, for example, things to be sensed, monitored, and/or controlled remotely across existing network infrastructure, which may create more opportunities for direct integration between the physical world and computer-based systems, and may result in improved efficiency, accuracy, and economic benefit. Each thing may be uniquely identifiable through its associated embedded computing system and is able to interoperate within the existing Internet infrastructure. Some experts estimate that the IoT will consist of almost 50 billion things by 2020. The things in the IoT can refer to a wide variety of device or object types such as, but not limited to, medical/biological devices, such as heart monitoring implants or biochip transponders in animals, consumer electronic devices and products, such as home appliances, home HVAC systems, home audio/video monitoring systems, and automobiles, and industrial electronic devices, such as security devices, manufacturing equipment, and environmental sensors. As the number of things having a connectivity capability increases, the amount of data to be aggregated and processed may also increase.

SUMMARY

In some embodiments of the inventive subject matter, a method comprises performing operations as follows on a processor of an edge device of a first network: providing a data filter rule in the edge device, the first network being under the authority of a first entity, receiving data from a thing in the first network, communicating the data toward an information processor via a second network when the data satisfies a condition of the data filter rule permitting communication of the data outside of the first network, the second network being under the authority of a second entity, and communicating the data toward a storage processor on the first network when the data does not satisfy the condition of the data filter rule permitting communication of the data outside of the first network. The first and second entities are different entities.

In other embodiments of the inventive subject matter, a system comprises a processor of an edge device of a first network and a memory coupled to the processor, which comprises computer readable program code embodied in the memory that when executed by the processor causes the processor to perform operations comprising: providing a data filter rule in the edge device, the first network being under the authority of a first entity, receiving data from a thing in the first network, communicating the data toward an information processor via a second network when the data satisfies a condition of the data filter rule permitting communication of the data outside of the first network, the second network being under the authority of a second entity, and communicating the data toward a storage processor on the first network when the data does not satisfy the condition of the data filter rule permitting communication of the data outside of the first network. The first and second entities are different entities.

In further embodiments of the inventive subject matter, a computer program product comprises a tangible computer readable storage medium comprising computer readable program code embodied in the medium that when executed by a processor of an edge device of a first network causes the processor to perform operations comprising: providing a data filter rule in the edge device, the first network being under the authority of a first entity, receiving data from a thing in the first network, communicating the data toward an information processor via a second network when the data satisfies a condition of the data filter rule permitting communication of the data outside of the first network, the second network being under the authority of a second entity, and communicating the data toward a storage processor on the first network when the data does not satisfy the condition of the data filter rule permitting communication of the data outside of the first network. The first and second entities are different entities.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet tiles, video files, audio files, picture files, and document exchange files.

As used herein, an edge device is a type of network device that connects a first network (e.g., a Local Area Network (LAN)) with a second network (e.g., a Wide Area Network (WAN) or the Internet), where the first and second networks operate under the authority of different entities. Thus, an edge device provides interconnectivity and traffic translation between different networks on their entering edges or the network boundaries.

As used herein, a "thing," when referred to in context to the IoT, is an object of the physical world (physical thing) or an object of the information world (virtual thing), which is capable of being identified and integrated into a communication network. Things have associated information, which can be static and dynamic. A physical thing may be capable of sensing, may be capable of being actuated, and may be capable of being connected. Examples of physical things include, but are not limited to, an electronic sensor, a robot, a good, a product, and a piece of electrical equipment. A virtual thing may be capable of being stored, may be capable of being processed, and may be capable of being accessed. Examples of virtual things include, but are not limited to, multimedia content and application software stored in a memory and executed by a processor.

Some embodiments of the inventive subject matter stem from a realization that a network edge device that demarcates the division between a first network under local authority and a second network under third party or public authority may be user programmable to identify networked things on the local or enterprise network and to associate filter rules for processing the data items generated by the networked things. For example, the edge device may be programmed to discard temperature readings from a particular temperature sensor unless the reading is above a first threshold or below a second threshold. The edge device may be programmed to discard all status reports from a washing machine except for error messages. Those discarded data may be communicated to, for example, a storage processor on the same network as the edge device where they may be used as a basis for updating the filter rule(s) or saved for future processing. The rules may be conditioned on a variety of factors including, but not limited to, time of day, week, month, parameter values, and the like. By forwarding only those data that satisfy the user defined filter rules to cloud entities for processing, network equipment power usage may be reduced, the amount of space reserved for storing the data from the networked things may be reduced, and the time used for processing the data generated by the networked things may be reduced. By implementing the filter rules in the network edge device, no changes need to be made in the design or implementation of the networked things and/or the cloud entities (e.g., manufacturers, third party data analyzers, etc.) that process the data from the networked objects. The intelligent network edge device can, therefore, be retrofitted into existing data collection/processing environments for networked things.

Figure 1:
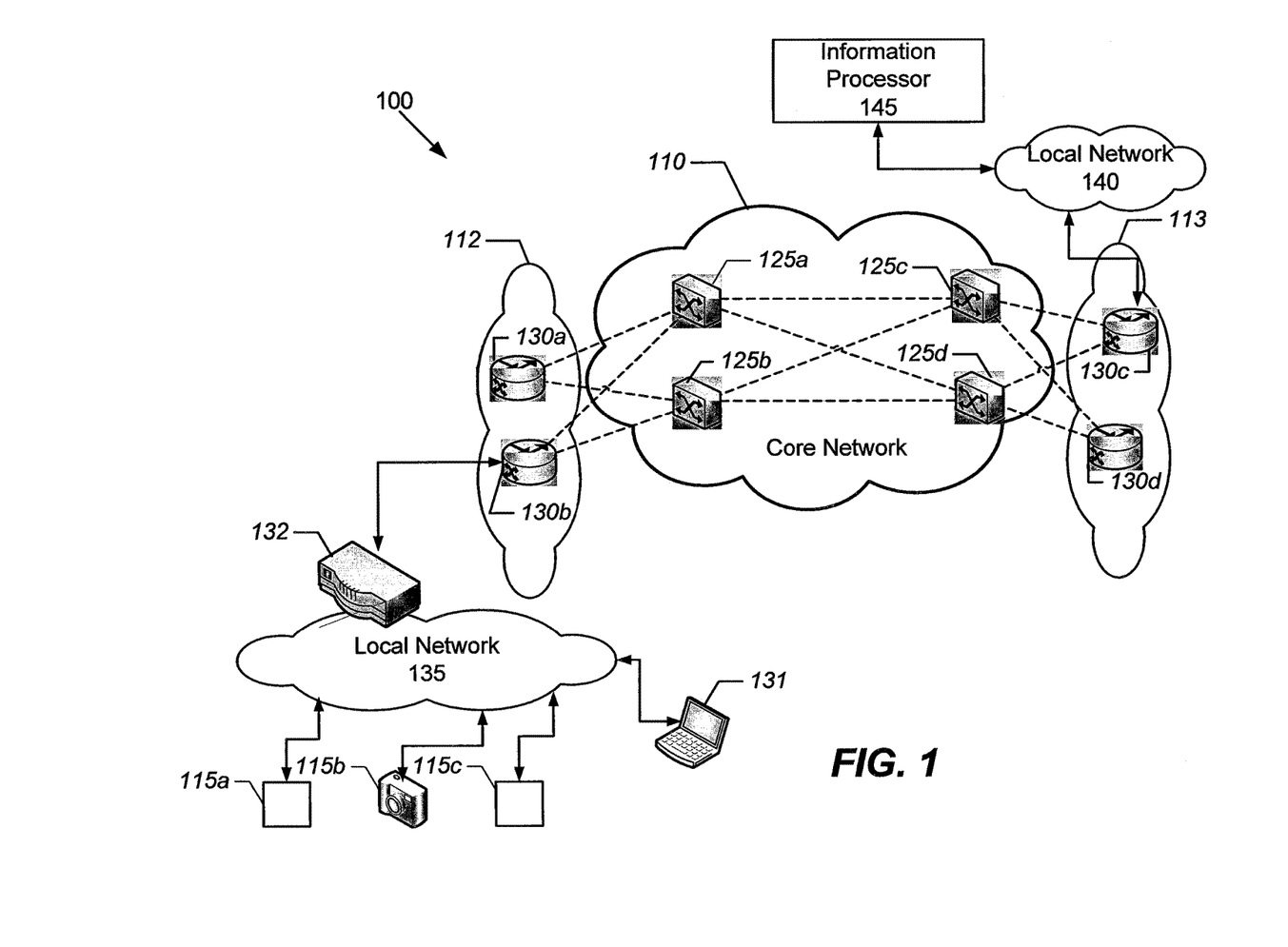
FIG. 1 is a block diagram of a communication network including an edge device for filtering Internet of Things (IoT) data in accordance with some embodiments of the inventive subject matter.

FIG. 1 is a block diagram of a communication network including an edge device for filtering Internet of Things (IoT) data in accordance with some embodiments of the inventive subject matter. The communication network 100 comprises a core network 110 coupled to a first access network 112 and a second access network 113. The core network 110 is the central part of the communications network 100 and provides various services to customers who are connected by the access networks 112 and 113. The core network 110 comprises switches/routers 125a, 125b, 125c, and 125d that are used to route calls and data traffic between the access networks 112 and 113. Access networks 112 and 113 comprise a part of the communications network 100 that is used to connect customers or subscribers to their immediate service provider. As shown in FIG. 1, access network 112 comprises switches/routers 130a, 130b along with the series of wires, cables, and equipment used to connect customers/subscribers associated with the local network 135. Similarly, access network 113 comprises switches/routers 130c, 130d along with the series of wires, cables, and equipment used to connect customers/subscribers associated with the local network 140. The core network 110, access network 112, and access network 113 may each operate under the authority of the same entity or different entities. For example, the access network 112 and the core network 110 may operate under the authority of a first service provider while the access network 113 may operate under the authority of a second service provider. The local networks 135 and 140 may operate under the authority of different entities than the core network 110, access network 112, and access network 113. For example, the local network 135 may be a private network or Virtual Private Network (VPN) implemented in a residence, small business, enterprise, etc. and may have things 115a, 115b, and 115c connected thereto as part of the IoT. The things 115a, 115b, and 115c may be connected to the local network 135 using wireless and/or wired connections. The local network 140 may be a private network or VPN implemented in an enterprise that uses the information processor 145 to process data generated by things, such as things 115a, 115b, and 115c, in the IoT. The information processor 145 may be connected to the local network 140 using a wireless and/or wired connection.

The core network 110, access network 112, and access network 113 may be a global network, such as the Internet or other publicly accessible network. Various elements of the core network 110, access network 112, and access network 113 may be interconnected by a wide area network, a local area network, an Intranet, and/or other private network, which may not be accessible by the general public. Thus, the core network 110, access network 112, and access network 113 may represent a combination of public and private networks or a VPN. The core network 110, access network 112, and access network 113 may be a wireless network, a wireline network, or may be a combination of both wireless and wireline networks.

The local network 135 may comprise an edge device 132 that may include a user interface through which a user may create filter rules for processing data items generated by things 115a, 115b, and 115c. For the various networked things 115a, 115b, and 115c, the rules specify which data is to be passed outside the local network 135 to an entity, such as a cloud entity information processor 145, for processing. Those data that are blocked the filter rules may be discarded or communicated to a storage processor 131 on the local network 135. For example, thing 115a may be a temperature sensor in a user's home and the user may have signed up for a home monitoring service with an enterprise that uses the information processor 145 to process and act on data received from their customers homes. The user may have created a rule in the edge device 132 that specifies temperature data from thing 115a only be communicated to the information processor 115a when the temperature is below a first threshold or above a second threshold as values in these ranges may be indicative of a failure of the HVAC system in the house. Similarly, in another example, thing 115c may represent a user's car and the user may have signed up for a ear maintenance plan with the manufacturer of the car, which uses the information processor 145 to process data transmitted from the user's car, such as mileage, driving characteristics, and the like, to recommend service appointments. The user, however, may wish to use another organization for oil changes. The user may create a rule in the edge device 132 to discard all data generated by the car 115c associated with remaining oil life so as not to send any such information to the information processor 145 as the user does not wish to manage oil changes through the manufacturer's service. Finally, thing 115b may represent a security camera for the user's home that can generate video and/or pictures at various locations around the user's residence and the user may have signed up for a home security service with an enterprise that uses the information processor 145 to process and act on video and picture information. The user may create a rule in the edge device 132 to only send video and picture information to the information processor 145 at night or on weekends when the residence is unoccupied. These foregoing examples are exemplary and it will be understood that other types of things 115a, 115b, and 115e may be used in other applications, such as residential, small business, enterprise, manufacturing, public service (e.g., schools), etc. As discussed above, discarded data may be communicated to a storage processor 131 and may be used as a basis, for example, for generating a revision for one or more data filter rule(s), which are then used to update the data filter rule(s) on the edge device 132. The data stored at the storage processor 131 may also be used to forward to an information processor 145 should the additional data be useful for managing one or more of the things 115a, 115b, and 115c.

Although FIG. 1 illustrates a system for using an edge device to filter IoT data in accordance with some embodiments of the inventive subject matter, it will be understood that embodiments of the present invention are not limited to such configurations, but are intended to encompass any configuration capable of carrying out the operations described herein.

Figure 2:
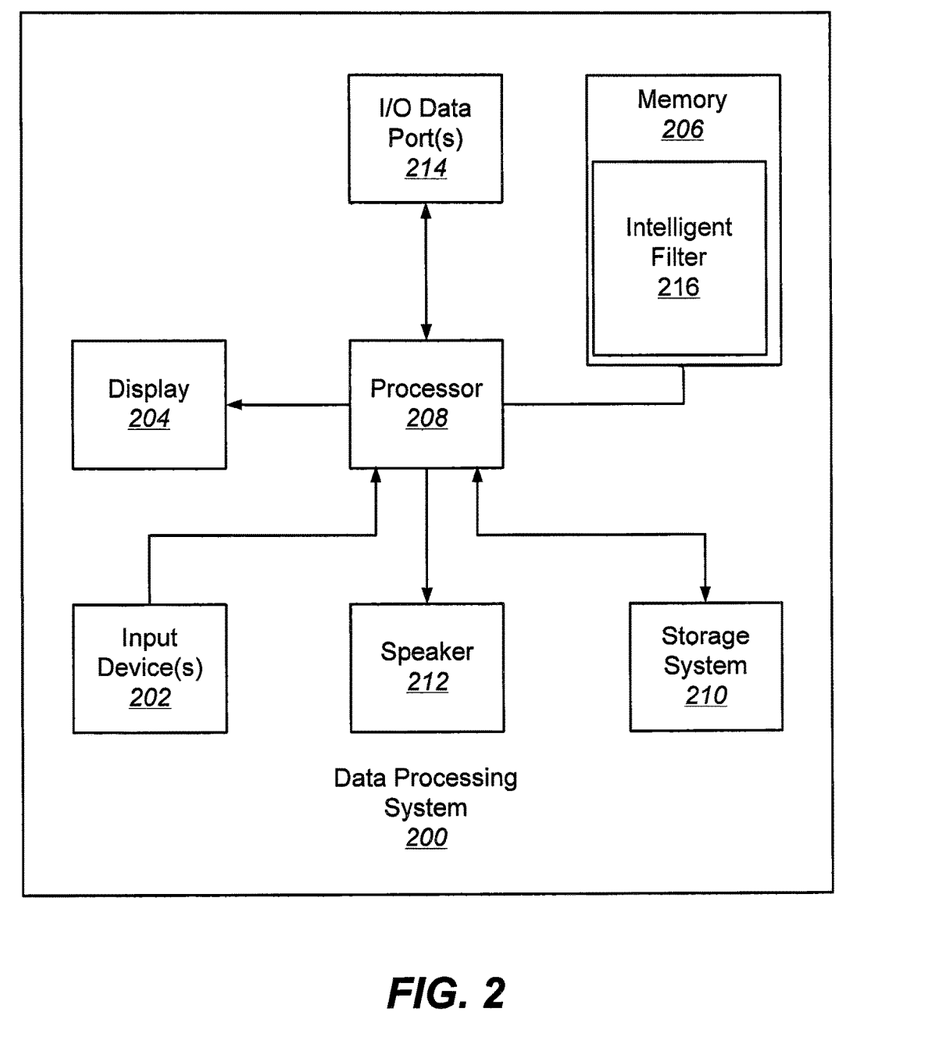
FIG. 2 illustrates a data processing system that may be used to implement the edge device of FIG. 1 in accordance with some embodiments of the inventive subject matter.

Referring now to FIG. 2, a data processing system 200 that may be used to implement the edge device 132 of FIG. 1, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with an intelligent filter module 216 that may provide functionality that may include, but is not limited to, filtering IoT data received from one or more things and communicating the IoT data to an information processor based on user defined rules.

Figure 3:
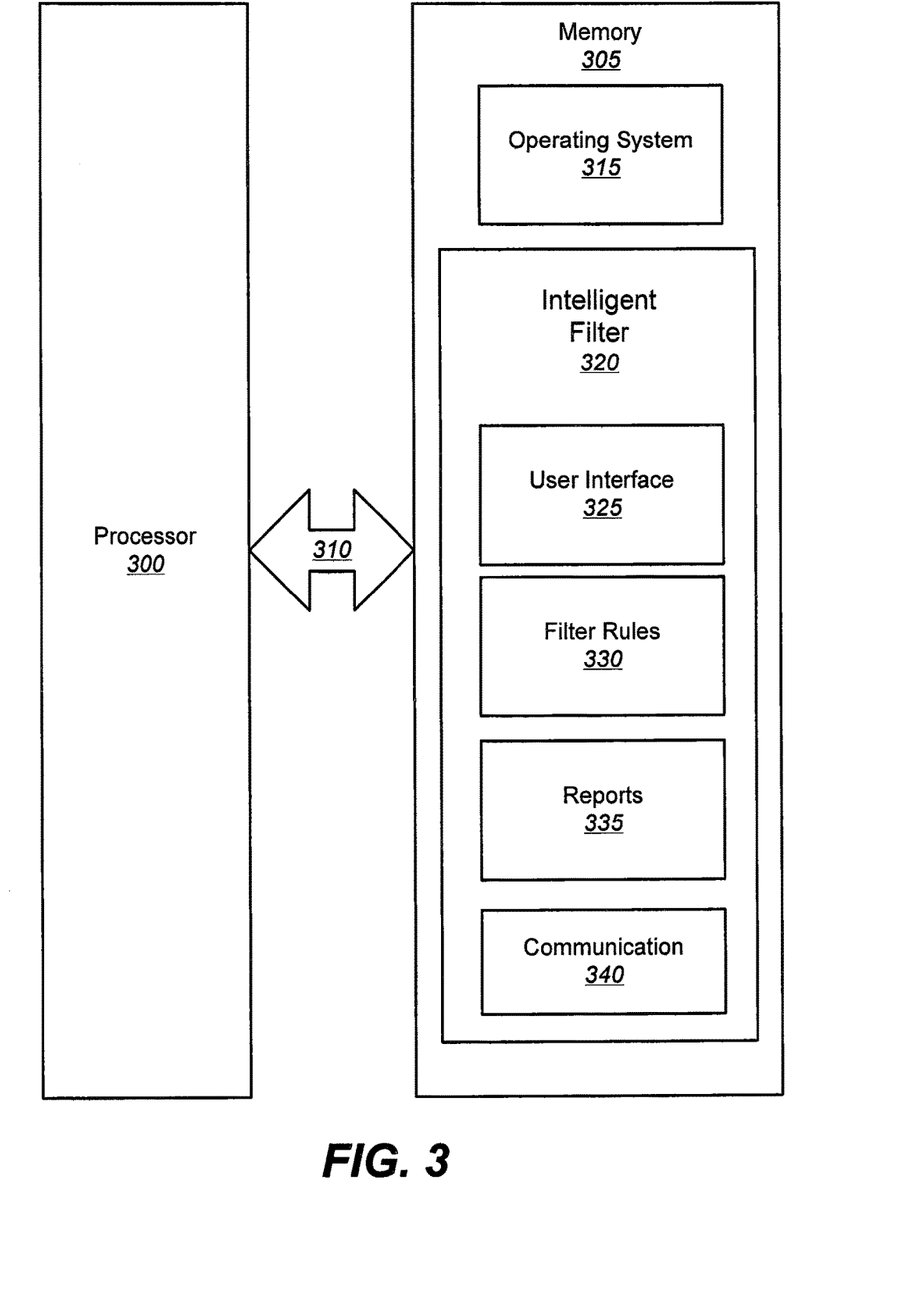
FIG. 3 is a block diagram that illustrates a software/hardware architecture for use in an edge device for filtering IoT data in accordance with some embodiments of the present inventive subject matter.

FIG. 3 illustrates a processor 300 and memory 305 that may be used in embodiments of data processing systems, such as the edge device 132 of FIG. 1 and the data processing system 200 of FIG. 2, respectively, for filtering IoT data in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for filtering IoT data in an edge device in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain two or more categories of software and/or data: an operating system 315 and an intelligent filter module 320, in particular, the operating system 315 may manage the data processing system's software and/or hardware resources and may coordinate execution of programs by the processor 300.

The intelligent filter module 320 may comprise a user interface module 325, a filter rules module 330, a reports module 335, and a communication module 340. The user interface module 325 may be configured to provide an interface between the edge device 132 and a user's computing device, such as a laptop computer, desktop computer, tablet, smart phone and the like to allow the user to create one or more rules for filtering IoT data generated by one or more things. In some embodiments, one or more rules may also be downloaded into the edge device as part of installing a thing on the local network 135 or registering for service that processes data from one or more things on the local network 135 through the information processor 145. The user may, for example, edit one or more of these downloaded rules to customize the rules according to the user's preferences as the downloaded rules may contain default filter parameters and thresholds.

The filter rules module 330 represents the generated and/or downloaded IoT data filter rules. These rules may be conditioned on a variety of factors including, but not limited to, time of day, week, month, parameter values, and the like. Rules may also be based on a value of a parameter contained in the IoT data. Such parameters may include, but are not limited to, environmental and geographic parameters. For example, a user may have a chemical sensing device installed in a swimming pool that provides periodic updates on status on an environmental parameter corresponding to the chemical concentrations in the pool. A user may create a rule to filter out and discard all status updates generated by the chemical sensing device unless the chemical concentration is determined to be in a range that is unacceptable for swimming and the pool requires immediate service. As another example, a user may equip a pet dog with a collar that includes a GPS tracking device. The GPS tracking device may send periodic updates on a geographic parameter corresponding to the location of the dog. A user may create a rule to filter out and discard all status updates generated by the GPS tracking device on the dog's collar unless the GPS update indicates the dog has traveled outside a defined boundary. In other embodiments, an IoT data filter rule may be based on a frequency in which IoT data from a thing is received at the edge device 132 and/or a cumulative amount of IoT data received from a thing. For example, if a thing is generated large amount of data, then the user may wish to discard every third data burst or set an upper limit on the amount of data communicated to the information processor 145 once the limit is reached. In accordance with various embodiments of the inventive subject matter, a rule may apply to a single thing or multiple things. A thing may also have multiple rules applied thereto or only a single rule applied thereto.

The reports module 335 may be configured to generate one or more reports for a thing that indicates the amount of data received from the thing that is communicated outside of the local network 135 to the information processor 145, for example, and the amount of data received from the thing that is blocked or not communicated outside of the local network 135. These reports may be based on a particular time period in some embodiments of the inventive subject matter. For example, a report may be based on a specified start and stop time or from the time the thing was placed into service in the local network 135 until the time the report is generated. A report may also break down how much data is communicated outside the local network 135 and how much data is blocked or not communicated outside of the local network 135 on a per rule basis.

The communication module 340 may be configured to facilitate communication between the edge device 132 and other entities, such as the things 115a, 115b, and 115c, the storage processor 131, and the information processor 145.

Although FIG. 3 illustrates hardware/software architectures that may be used in data processing systems, such as the edge device 132 of FIG. 1 and the data processing system 200 of FIG. 2, respectively, for filtering IoT data in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 1-3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the edge device 132 of FIG. 1, the data processing system 200 of FIG. 2, and the hardware/software architecture of FIG. 3, may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 1-3 may be used to filter IoT data according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 206 coupled to the processor 208 and the memory 305 coupled to the processor 300 include computer readable program code that, when executed by the respective processors, causes the respective processors to perform operations including one or more of the operations described herein with respect to FIG. 4.

Figure 4:
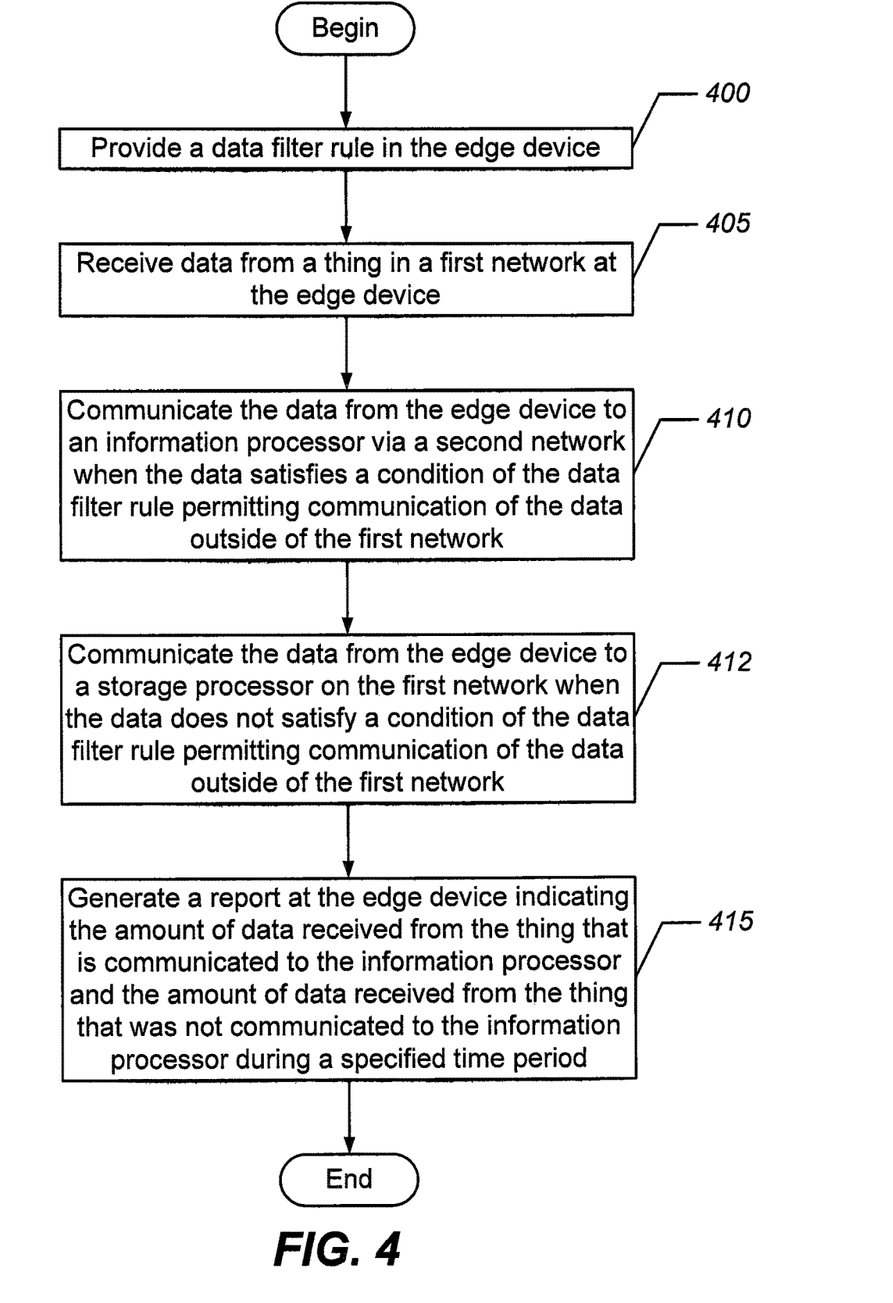
FIG. 4 is a flowchart that illustrates operations of an edge device for filtering IoT data in accordance with some embodiments of the inventive subject matter.
Figure 5A:
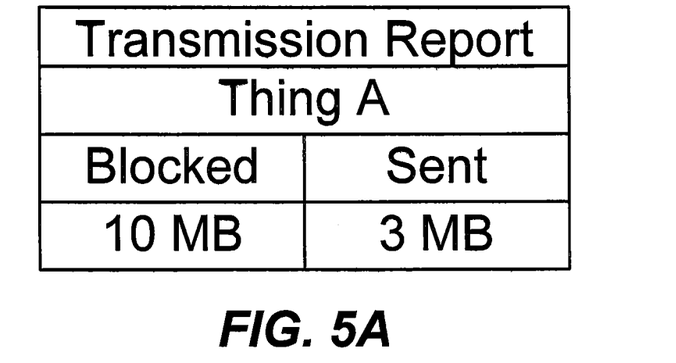
FIGS. 5A and 5B are diagrams that illustrate reports generated by an edge device when filtering IoT data in accordance with some embodiments of the inventive subject matter.
Figure 5B:
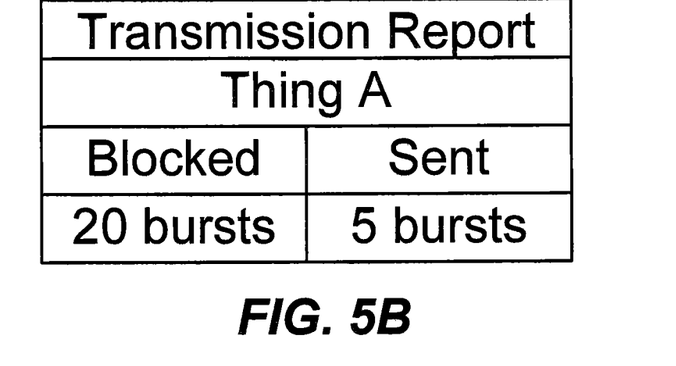

FIG. 4 is a flowchart that illustrates operations of an edge device for filtering IoT data in accordance with some embodiments of the inventive subject matter. Referring now to FIG. 4, operations begin at block 400 where a data filter rule for filtering IoT data from one or more things is provided in the edge device 132. As described above, the data filter rule may be created by the user through the user interface 325 or may be downloaded from another data processing system. The user may also edit existing rules to change thresholds, conditions, and the like. At block 405 the edge device 132 receives data from a thing, such as one of the things 115a, 115b, 115c. In accordance with various embodiments of the inventive subject matter, the thing may be an object of the physical world or an object of the information world having an identification in the network 135. That data received from the thing 115a, 115b, 115c is communicated from the edge device 132 to the information processor 145 at block 410 via the access network 112, core network 110, access network 113, and local network 140 when the data satisfies a condition of the data filter rules permitting communication of the data outside of the network 135. When the data received from the thing 115a, 115b, 115c does not satisfy a condition of the data filter rules permitting communication of the data outside of the network 135, the edge device 132 communicates the data the storage processor 131 on the local network 135 at block 412. The reports module 335 may generate a report at block 415 indicating the amount of data received from the thing 115a, 115b, 115c that is communicated to the information processor 145 and/or the amount of data received from the thing 115a, 115b, 115c that was not communicated to the information processor 145 during a specified time period. As shown in FIG. 5A, the transmission report may provide statistics in terms of the amount of data in bytes that is blocked and sent. In other embodiments shown in FIG. 5B, the transmission report may provide statistics in terms of the number of individual units of data received from a thing 115a, 115b, 115c that are blocked and sent. For example, every time a thing sends a defined collection of data to the edge device 132 this may be considered a burst of data. Thus, a burst may be a single message, a single frame, a single packet or multiple messages, frames, or packets depending on how the thing 115a, 115b, 115c is designed. Generally, the transmission of individual bursts of data is separated in time. As described above, in addition to breaking down how much data is communicated to the information processor 145 and how much data is blocked at the edge device 132 on a thing 115a, 115b, 115c basis, the reports may also break down such statistics on a per rule basis for a single thing 115a, 115b, 115c or multiple things.

Some embodiments of the inventive subject matter provide a network edge device that includes a user interface through which a user may create filter rules for processing data items generated by things in a first network. For the various networked things, the rules specify which data is to be passed outside the first network to an entity, such as a cloud entity, by way of a second network for processing. Those data that are blocked by the filter rules may be discarded or communicated to a storage processor on the first network. The rules may be conditioned on a variety of factors including, but not limited to, time of day, week, month, parameter values, and the like. By forwarding only those data that satisfy the user defined filter rules to cloud entities for processing, network equipment power usage may be reduced, the amount of space reserved for storing the data from the networked things may be reduced, and the time used for processing the data generated by the networked things may be reduced. The network edge device may provide reports showing how much data is being filtered out (i.e., discarded) by thing and/or rule so the user can adjust the rules accordingly to ensure that a desired amount of data is being passed through versus blocked.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   performing operations as follows on a processor of an edge device of a first network, the edge device connecting the first network with a second network, the operations comprising:
   receiving and implementing a data filter rule in the edge device specifying a condition permitting communication of data generated by a networked electrical equipment in the first network to an information processor on the second network for the information processor to process the data generated by the networked electrical equipment and perform an action based upon the data generated by the networked electrical equipment, the first network being under the authority of a first entity, wherein the data filter rule is based on a date, a value of an environmental parameter contained in the data, a frequency in which the data is received at the edge device, and a cumulative amount of data received from the networked electrical equipment, the condition comprising the data generated by the networked electrical equipment being one of: being outside of a specified environmental parameter range or generated when the networked electrical equipment is outside of a geographic boundary or being above or below a threshold indicative of a failure in the networked electrical equipment;
   receiving, via the first network, data generated by the networked electrical equipment in the first network, the networked electrical equipment having an identification within the first network; and
   responsive to the data satisfying the condition of the data filter rule permitting communication of the data generated by the networked electrical equipment in the first network outside of the first network, communicating, via the second network, the data generated by the networked electrical equipment which satisfies the condition of the data filter rule and the identification of the networked electrical equipment toward the information processor on the second network for the information processor to process the data and perform the action based upon the data, the second network being under the authority of a second entity.

2. The method of claim 1, further comprising:
receiving, via the first network, a revision for the data filter rule from the storage processor responsive to communicating the data towards the storage processor; and
updating the data filter rule based on the revision for the data filter rule.

3. The method of claim 1, wherein the networked electrical equipment is an object of the physical world having an identification within the first network.

4. The method of claim 1, wherein the networked electrical equipment is an object of the information world having an identification within the first network.

5. The method of claim 1, wherein providing the data filter rule comprises providing the data filter rule based on input received from a user.

6. The method of claim 1, wherein the data filter rule is based on one of a date and a time.

7. The method of claim 1, wherein the data filter rule is based on a value of a parameter contained in the data.

8. The method of claim 7, wherein the parameter comprises one of an environmental parameter and a geographic parameter.

9. The method of claim 1, wherein the data filter rule is based on one of a frequency in which the data is received at the edge device and a cumulative amount of the data received from the networked electrical equipment.

10. The method of claim 1, further comprising:
generating a report indicating the amount of data received from the networked electrical equipment communicated toward the information processor and the amount of data received from the networked electrical equipment communicated, through the first network without using the second network, toward the storage processor during a specified time period.

11. The method of claim 1 wherein communicating the data toward an information processor in the second network via the second network comprises translating first traffic having the data in the first network to second traffic having the data in the second network.

12. The method of claim 1 further comprising:
responsive to receiving, from a user interface of the edge device, a revision for the data filter rule based on input received from a user, updating the data filter rule based on the revision for the data filter rule.

13. The method of claim 1 wherein the first network comprises a local network and the second network comprises the Internet.

14. The method of claim 1 further comprising responsive to the data not being communicated outside of the first network when the data does not satisfy the condition of the data filter rule permitting communication of the data generated by the networked electrical equipment in the first network outside of the first network, communicating the data generated by the networked electrical equipment through the first network without using the second network toward a storage processor on the first network for the storage processor to store the data.

15. A system, comprising:
a processor of an edge device of a first network that connects the first network with a second network; and
a memory coupled to the processor and comprising computer readable program code embodied in the memory that when executed by the processor causes the processor to perform operations comprising:
receiving and implementing a data filter rule in the edge device specifying a condition permitting communication of data generated by a networked electrical equipment in the first network to an information processor on a second network for the information processor to process the data generated by the networked electrical equipment and perform an action based upon the data generated by the networked electrical equipment, the first network being under the authority of a first entity, wherein the data filter rule is based on a date, a value of an environmental parameter contained in the data, a frequency in which the data is received at the edge device, and a cumulative amount of data received from the networked electrical equipment, the condition comprising the data generated by the networked electrical equipment being one of: being outside of a specified environmental parameter range or being generated when a location of the networked electrical equipment is outside of a geographic boundary or being above or below a threshold indicative of a failure in the networked electrical equipment;
receiving, via the first network, data generated by the networked electrical equipment in the first network, the networked electrical equipment having an identification within the first network; and
responsive to the data satisfying the condition of the data filter rule permitting communication of the data from the networked electrical equipment in the first network outside of the first network, communicating, via the second network, the data and the identification of the networked electrical equipment toward an information processor on a second network for the information processor to process the data and perform the action based upon the data, the second network being under the authority of a second entity.

16. The system of claim 15, wherein the operations further comprise:
receiving a revision for the data filter rule from the storage processor responsive to communicating the data towards the storage processor; and
updating the data filter rule based on the revision for the data filter rule.

17. The system of claim 15, wherein providing the data filter rule comprises providing the data filter rule based on input received from a user.

18. The system of claim 15, wherein the operations further comprise:
generating a report indicating the amount of data received from the networked electrical equipment communicated, via the second network, toward the information processor and the amount of data received from the networked electrical equipment communicated, through the first network without using the second network, toward the storage processor during a specified time period.

19. A computer program product, comprising:
a non-transitory computer readable storage medium comprising computer readable program code embodied in the medium that when executed by a processor of an edge device of a first network causes the processor to perform operations comprising:
receiving and implementing a data filter rule in the edge device specifying a condition permitting communication of data generated by a networked electrical equipment in the first network to an information processor on a second network for the information processor to process the data generated by the networked electrical equipment and perform an action based upon the data generated by the networked electrical equipment, the first network being under the authority of a first entity, wherein the data filter rule is based on a date, a value of an environmental parameter contained in the data, a frequency in which the data is received at the edge device, and a cumulative amount of data received from the networked electrical equipment, the condition comprising the data generated by the networked electrical equipment being one of: being outside of a specified environmental parameter range or being generated when a location of the networked electrical equipment is outside of a geographic boundary or being above or below a threshold indicative of a failure in the networked electrical equipment, wherein the edge device connects the first network with the second network;

receiving, via the first network, data generated by the networked electrical equipment in the first network, the networked electrical equipment having an identification within the first network; and responsive to the data satisfying the condition of the data filter rule permitting communication of the data generated by the networked electrical equipment in the first network outside of the first network, communicating, via the second network, the data generated by the networked electrical equipment which satisfies the condition of the data filter rule and the identification of the networked electrical equipment toward the information processor on the second network for the information processor to process the data and perform the action based upon the data, the second network being under the authority of a second entity.

20. The computer program product of claim 19, wherein the operations further comprise:

receiving a revision for the data filter rule from the storage processor responsive to communicating the data towards the storage processor; and updating the data filter rule based on the revision for the data filter rule.

21. The computer program product of claim 19, wherein the operations further comprise:

generating a report indicating the amount of data received from the networked electrical equipment communicated toward the information processor and the amount of data received from the networked electrical equipment communicated toward the storage processor during a specified time period.

* * * * *